United States Patent [19]
Muller et al.

[11] Patent Number: 5,093,977
[45] Date of Patent: Mar. 10, 1992

[54] DEVICE FOR PROCESSING DIFFERENTLY SHAPED WORKPIECES

[75] Inventors: Karl H. Muller, Ingolstadt; Volker Riedl, Gaimersheim; Bernhard Arbesmeier, Altmannstein/Hagenhill, all of Fed. Rep. of Germany

[73] Assignee: Audi AG, Postfach 220, Ingolstadt

[21] Appl. No.: 276,504
[22] PCT Filed: Dec. 20, 1986
[86] PCT No.: PCT/EP86/00774
§ 371 Date: Feb. 12, 1990
§ 102(e) Date: Feb. 12, 1990
[87] PCT Pub. No.: WO87/03835
PCT Pub. Date: Jul. 2, 1987

[30] Foreign Application Priority Data

Dec. 21, 1985 [DE] Fed. Rep. of Germany ....... 3545537

[51] Int. Cl.⁵ .................................................. B23Q 3/155
[52] U.S. Cl. .................................. 29/568; 29/791; 219/86.24
[58] Field of Search ............. 29/568, 33 K, 26 A, 29/791; 219/125.1, 86.24, 87, 86.8; 228/47

[56] References Cited

U.S. PATENT DOCUMENTS

| | | | |
|---|---|---|---|
| 4,593,850 | 7/1986 | Arigaehl | 228/47 |
| 4,670,961 | 7/1987 | Fontaine et al. | 29/33 K X |
| 4,893,398 | 1/1990 | Zimmer | 29/568 |
| 4,926,539 | 5/1990 | Muller et al. | 29/568 |
| 4,946,089 | 8/1990 | Baulier et al. | 219/86.24 |

FOREIGN PATENT DOCUMENTS

| | | |
|---|---|---|
| 2739010 | 3/1978 | Fed. Rep. of Germany. |
| 1427420 | 1/1979 | Fed. Rep. of Germany. |
| 3149864 | 6/1982 | Fed. Rep. of Germany. |
| 3341169 | 4/1985 | Fed. Rep. of Germany. |
| 692708 | 11/1979 | U.S.S.R. ........................... 219/87 |
| 1407725 | 7/1988 | U.S.S.R. ........................... 219/86.24 |

OTHER PUBLICATIONS

"Widerstands-Schweissen", Vortrage der 4. Stuttgarter Sondertagung, Widerstands-Schweisstechnik 1960, pp. 13–19.
W. Stanley, "Resistance Welding, Designing, Tooling, and Applications", McGraw-Hill Book Company, Inc., 1950, pp. 110–113.

*Primary Examiner*—William Briggs

[57] ABSTRACT

A device is provided for the automatic processing of differently shaped workpieces having a controlled tool-changing capability which permits a quick change of the set of tools in the device. This enables optimum adjustment of the tools to be made economically outside the production line. It also enables several different moveable and interchangeable tool frames to be located and moved on a lower frame into a variety of configurations. One tool frame is used at a time and when it is required to switch, several simple steps enable one tool frame to be moved to one side of the lower frame and a second tool frame to be moved into the operating position.

10 Claims, 3 Drawing Sheets

DEVICE FOR PROCESSING DIFFERENTLY SHAPED WORKPIECES

BACKGROUND AND DISCUSSION OF THE INVENTION

The present invention relates to a device for the automatic processing of differently shaped workpieces which has a controlled tool-changing capability. The tool changing device of the present invention is particularly useful for the spot-welding of parts or workpieces.

Previous tool-changing devices typically consist of a frame having several different tools which are brought into use alternatively accordingly to the operational steps in an existing program or processing routine. Several of these devices can be arranged and interconnected by intermediate conveyors one after the other which transport the parts to be processed to the devices, thereby forming a production line.

An object of the present invention is to develop an improved processing and tool-changing device which provides for a quick change of the complete set of tools in the device as well as in the workpiece receiving fixture. The present invention, provides a device having an improved adaptability to accommodate different workpieces and wherein a quick tool change and an optimum adjustment of the tools outside the production line can be made in an economical manner, even under operating conditions.

Preferably, the tool-changing device comprises a lower frame and a plurality of tool frames which are of identical construction and are placed onto the lower frame. Fortunately many identical parts can be used in the tool-changing device of the present invention even though it is capable of accommodating workpieces of very different shapes. Alternately, the tool frames can be displaced on the lower frame along a longitudinal guide into a central working position. In this central working position, the workpieces are fed to the tool frame and are processed by the variety of tools arranged in the tool frame. If there is a workpiece of a different shape or if a workpiece of the same type is to be processed in another manner, the current tool frame is moved to one side and a different tool frame which is now required is displaced from the other side into the central working position. By this design, it is possible, in the case of workpieces of considerably different shapes or requiring varying processing operations, to change the tools very quickly. Moreover, if a plurality of these devices are arranged one after the other in a production line or even if devices of this type are used at various locations or by various manufacturers, the same lower frames and the same tool frames can always be used with the result that the manufacturing costs are considerably reduced.

Preferably, the individual tool frames are equipped only with different tools enabling one to adjust the tools externally thereby reducing the adjustment time needed during production. Positioning new tools or arranging them in conjunction with a new part no longer needs to be done in the production line Also, the tool frames can be easily exchanged by means of a crane or a fork lift truck, since, in contrast to previous tool changing devices, the frame and the tools are completely separate.

The present invention is especially useful in spot-welding operations using electrode holders or production sequences with low counterpressure. Pinning is appropriate when working with large pressures. Although the present invention, in principle, can be used for parts of the most varied orders of magnitude, it is especially useful in the case of medium-sized parts.

In contrast to the present tool-changing devices which are designed as a unit, and in particular such devices used for welding, the lower frame, the tool frames and the conveying mechanism of the present invention can be reused and are fully reutilized. For example, after an initial production run, it is possible for tool frames having the tools fixed therein to be removed and used later for a production run for spare parts without any modification.

The tool frames in the present invention are moved into the working position over the central section of the lower frame by a displacing unit. A variety of devices known to one skilled in the art can be used. For example, a pneumatic device which has a rodless cylinder that enables strokes of over 2 meters can be used advantageously as the displacing unit. Another feature of the present invention is that the tool frames can be centered in position above the central section of the lower frame (i.e. the working position) by a centering unit and then fastened by means of a clamping unit.

The tool frames themselves comprise a base plate and a head plate which are connected to one another by a plurality of columns. The tools are fastened to either the head plate, the columns, or both. In order to permit the easy installation and removal of the tools and to combine a plurality of devices one after the other in a production line, it is preferable if the workpieces can be passed through the device from one side. The free accessibility thereby created not only enables improved insertion and removal of the workpieces, but also facilitates maintenance work, such as the replacement of electrode caps in a device having welding tools.

Provided in the base plate of the tool frame is a recess into which the bottom plate of a workpiece holder is inserted. In the area of this bottom plate, a lifter is arranged in the central section of the lower frame. A table closing off the lifter at the top can be connected to the bottom plate of the workpiece holder by a second centering and clamping device. By the two centering and clamping devices, one for securing the tool frame to the lower frame and the other for securing the workpiece holder to the lifter, an arrangement is created which permits precision work to be performed on the workpiece.

The table connected to the bottom plate of the workpiece holder can be moved by a controlled drive (e.g. a three-phase flat-geared motor) from a lower insertion position into an upper processing position enabling the tools to act on the workpiece. The workpiece holder can be lifted in the reverse direction to such an extent that when the centering devices and clamping devices are released, it is possible to displace the tool frames on the longitudinal guide to beyond the table.

The tool frames in the present invention can have a variety of arrangements. The first arrangement consists of only one tool frame mounted over the central section of the lower frame. With this arrangement, there is no direct means of changing the tool frame, however, the advantage of this device is that it can be used in conjunction with other similar single tool frame devices by linking several of them together. The result is the same as if a device having a simple changing means for the tool frames is used. The second arrangement utilizes a lower frame having a central section, a left hand section and a right hand section which are arranged next to one another in a row and provided thereon are two tool frames for alternating use. When not in use, the tool frames are stored in the left and right hand sections. The third arrangement consists of a central section, two left hand sections and two right hand sections. This arrangement permits the alternative use of three tool frames.

This third arrangement is particularly advantageous since it enables the alternate use of the three tool frames. In this arrangement, the lower frame and the displacing unit are extended beyond the left hand section and the right hand section of the two-tool frame arrangement for forming the additional locating surfaces for the third tool frame. Preferably, the individual sections are arranged in a U-shape rather than a straight line which makes it more convenient to alternately use the three tool frames. It is of course also possible, by enlarging the lower frame, to increase the number of tool frames which can be alternatively used, however, this does not necessarily create any advantages which could not also be gained by interlinking a plurality of these devices one after the other with a conveying means between them.

In all these arrangements, the same tool frames can be used and exchanged one for the other. In addition, the central section having the lifter can be used in any of these arrangements. Similarly, the outer sections in the second and third arrangements conveniently are made using identical elements which are joined by a suitable connecting means.

Each tool frame can be provided with a separate conveying means by which the workpiece can be automatically picked up, inserted into the workpiece holder and moved out of the device after processing is complete. In a further development of this feature, each tool frame can have a separate drive for each conveying means arranged thereon. The conveying means enables a workpiece to be picked up, inserted into the workpiece holder, and once processing is complete, moved out of the device. Many different types of conveying means can be used as one skilled in the art would know.

Fully automatic conveying is also possible in the present invention if the conveying means of the tool frame receives the workpiece from one conveyor and after the processing is finished places it onto another conveyor. When a plurality of devices according to the present invention are coupled, it is also possible for the preceding conveyer to deposit the workpiece on a lifter between the two devices in such a way that the conveyor of the following tool frame can pick it up. An intermediate conveyor having a lifter (for example, a translational rocking arm) may be necessary with lower frames having the U-shaped configuration.

The power supply and the means for controlling the tools in the tool frames of the present invention can be effected by lines or cables preferably from one or more locations above the tool frames. Cable-trailing devices can also be used to enable the tool frames to be moved. Thus, contact reels and complicated transmission devices can be avoided. Moreover, when the cables are secured on each tool frame in such a way as to be easily releasable (for example, by connectors or quick-acting couplings), the tool frames can be dismantled very quickly and cost-effectively. Further work for replacing a tool frame is not really necessary.

Preferably, the tool frames of the present invention are easily displaceable with the help of a support means such as spring-mounted ball castors located on the lower frame. With this arrangement, the springs are designed in such a way that they apply, as a whole, a larger upward force than the force due to the weight of the tool frame. Consequently, when the tool frame is being clamped down, it is only necessary for the clamping device to overcome the difference between both forces. This difference in force can be accurately established by the selection of the springs so that only small forces are required for the clamping itself.

The tool-changing operation of the present invention using an automatic control will now be described. Starting with a device having a lower frame comprising a central section, a left hand section and a right hand section, the tool frames each occupying an outer position on the left hand and right hand sections, the displacing unit is first moved toward the selected tool frame. Once the end position is reached, pinning takes place, i.e. a positive connection is made between the tool frame and the driver of the displacing unit. Once pinning is effected, the displacing unit pulls or pushes the tool frame over the central section of the lower frame. Next, the centering units move out of the lower frame and then the clamping units which pull the tool frame against the central section of the lower frame.

Once the tool frame is fixed on the central section of the lower frame, the workpiece holder arranged on the tool frame is centered with the lifter located in the lower frame. For this purpose, the table of the lifter is provided with a corresponding centering device which interacts with the bottom plate of the workpiece holder. Following the centering operation, both parts are fastened by means of a separate clamping device.

The operation of mounting the workpiece and the subsequent processing can now begin. During this procedure, the part or workpiece to be processed is placed in front of the working station into the conveyor located in the tool frame and moved by the conveyor into the workpiece holder which is in the receiving position. The workpiece holder is then raised by the lifter to take the part to be processed out of the conveyor and move it up into the processing position. While the part is being processed, the conveyor can return so that, once processing is complete and the workpiece holder has been lowered, it can move the processed part out of the tool frame and also introduce a new part into the tool frame.

If the tool frame is to be changed for carrying out another processing phase or for processing a workpiece of a different configuration, this is done by releasing the clamping device, the centering devices of the lifter and the lower frame, by the displacing unit moving the tool frame which is no longer required to the side and then moving the new tool frame onto the central section of the lower frame. It is more convenient if the displacing unit has to perform only rectilinear movements. A plurality of displacing units, (air cylinders for example), are needed for movement in more than one direction such as in the case of the lower frame with sections arranged in a U-shape.

Other details, objects and advantages of the present invention will become more readily apparent from the following description of a presently preferred embodiment thereof.

BRIEF DESCRIPTION OF THE DRAWINGS

In the accompanying drawings, a preferred embodiment of the invention is illustrated, by way of example only, wherein.

DETAILED DESCRIPTION OF THE PREFERRED EMBODIMENT

Figure 1:
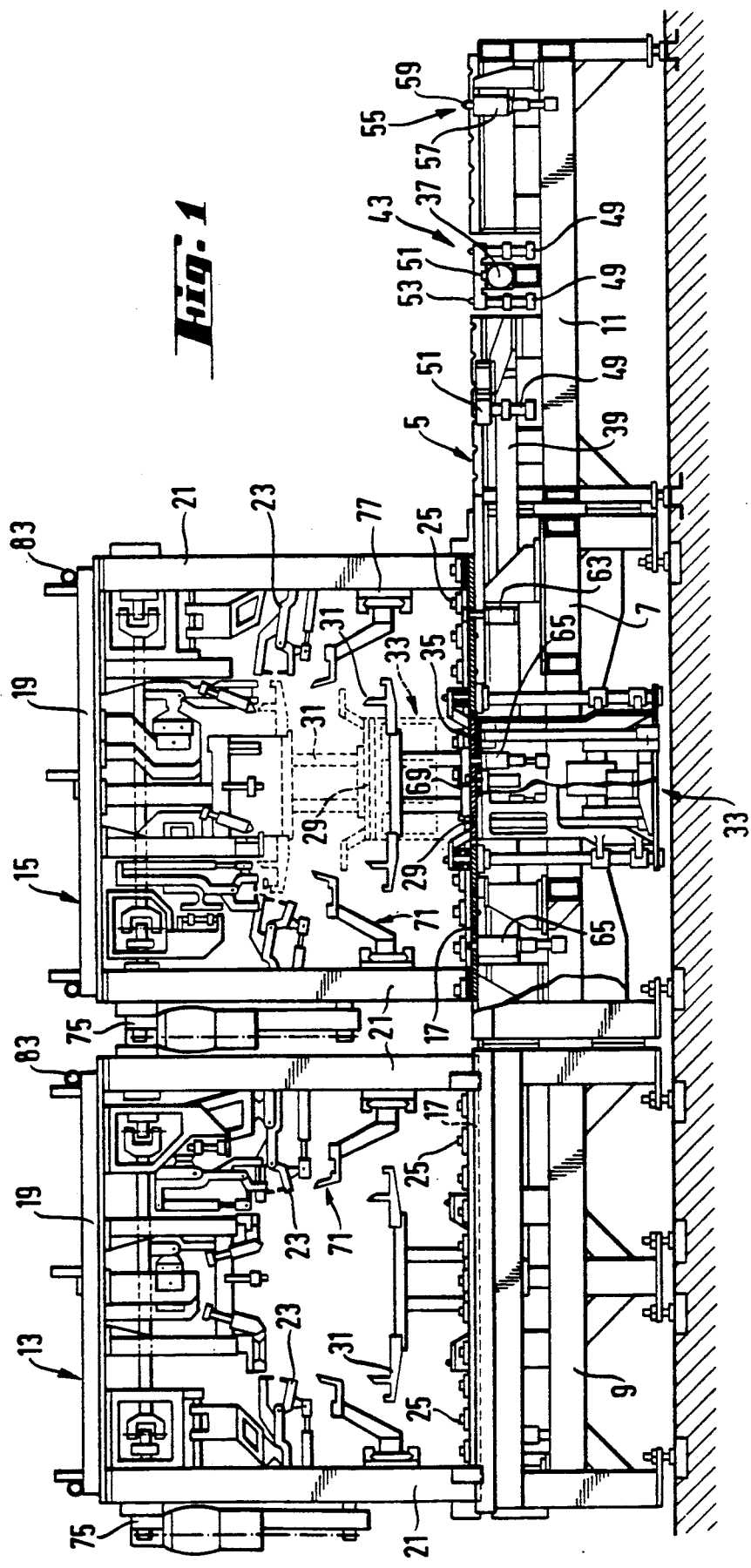
FIG. 1 shows a front view of a device for the automatic processing of differently shape workpieces.

A device for the automatic processing of differently shaped workpieces preferably consists of a frame 5 having a central section 7, a left hand section and a right hand section 11. Tool frames 13 and 15 are placed onto the lower frame 5. In their dimensions and connections, both tool frames 13 and 15 are of identical construction. They preferably consist of a base place 17, a head place 19 and also perpendicular columns 21 connecting the base plate 17 and the head plate 19. A variety of tools 23 for processing a workpiece are fastened to the head plates 19. In the present device, which is designed for spot-welding, the tools 23 can also be fastened to the columns 21. These are mainly electrode holders.

On their underside, the base plates 17 of the tool frames 13 and 15 are provided with spring-mounted ball castors 25 whose springs are designed in such a way that they apply, as a whole, a larger upward force than the force due to the weight of the complete tool frame so that the tool frame can be easily moved and clamped down with little force. Here, a force which corresponds to the difference between the spring force and the force due to the weight is sufficient to clamp down the tool frame.

Figure 2:
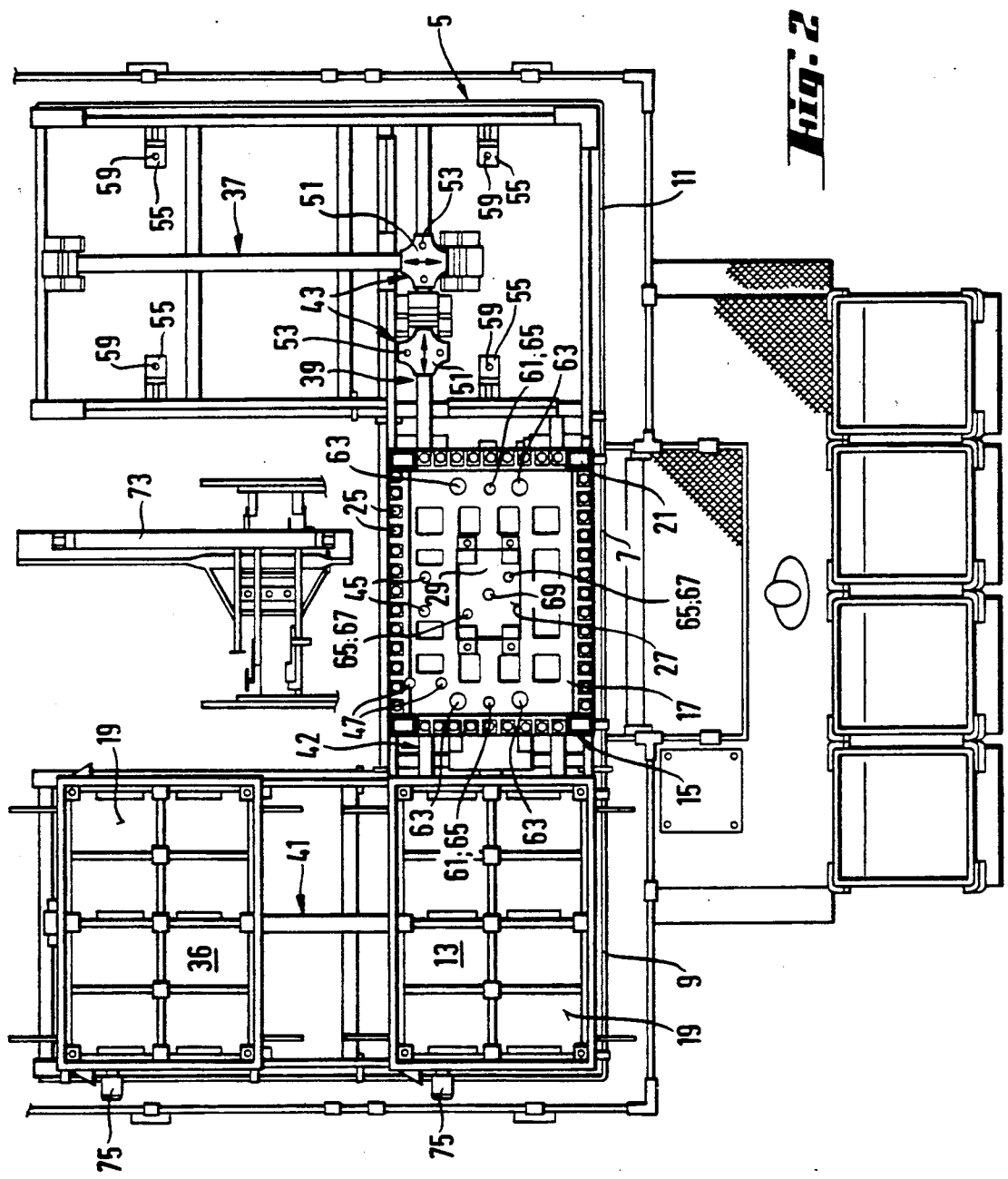
FIG. 2 shows a plan view of the device shown in FIG. 1.

As shown in FIG. 2, a rectangular recess 27 is provided in the center area of the base plate 17 of the tool frame 15, shown in greater detail in this figure. The bottom plate 29 of a workpiece holder 31 is mounted in this recess 27 in a floating manner on disk-spring stacks in conjunction with coarse-centering devices.

In the area beneath the workpiece holder 31, the central section 7 of the lower frame 5 is equipped with a lifter 33. The lifter 33 is closed off at the top by a table 35.

Referring to FIG. 2, the lower frame 5 is of a U-shaped construction and includes a total of five locations at which tool frames can be mounted, thus enabling three tool frames to be moved in such a way that each tool frame can alternatively be brought into use over the central section 7 of the lower frame 5. In the drawing, the tool frames 13 and 36 are only indicated, whereas the tool frame 15 is reproduced in detail without head plate 19 and tools 23.

To enable the tool frames to be moved in a desired manner over the central section 7, a total of four displacing units 37, 39, 41 and 42 are provided. These displacing units are characterized by a rodless cylinder having a pneumatic actuation, permitting larger strokes (over 2 m) to be achieved without problem. Each displacing unit has a driver 43 to engage allocated bores in the base plate 17 of the tool frames. For this purpose, each driver 43 consists of two pneumatic cylinders 49, a driving plate 51 and connecting pins 53. To move the tool frames, the driver 43 is first moved toward the tool frame up to its bores 45 and 47, respectively. The connecting pins 53 are then extended, inserted into the bores 45 and 57, respectively, and moved into the desired position by the displacing unit, whose main component is a pneumatically acting rodless cylinder.

If this position is not the central section 7, in which the processing is carried out, but another section of the lower frame 5, the tool frame is secured in this position by means of two pinning units 55 each. The pinning units comprise hydraulic cylinders 57 and centering points 59, the points interacting with bores 61 in the base plates of the tool frames. If tool frame 15 is located above the central section 7 of the lower frame 5, the tool frames are accurately secured in their working position by centering units. The tool frames are additionally clamped down in the working position by means of four hydraulically driven swivelling clamping cylinders 63. Only a small force is necessary to clamp down the tool frames mounted on spring-mounted ball castors, so that swivelling clamping cylinders 63 of relatively small dimensions can be used.

If the tool frame 15 is centered and firmly connected to the lower frame, the bottom plate 29 of the tool holder 31 mounted in the recess 27 of the base plate 17 is connected in a similar manner to the table 35 of the lifter 33. Here, too, centering devices 65 are provided which, with their tips, engage bores 67 in the bottom plate 29. A central clamping device 69, likewise formed by a swivelling clamping cylinder, is provided to clamp the bottom plate 29 down onto the table 35.

Figure 3:
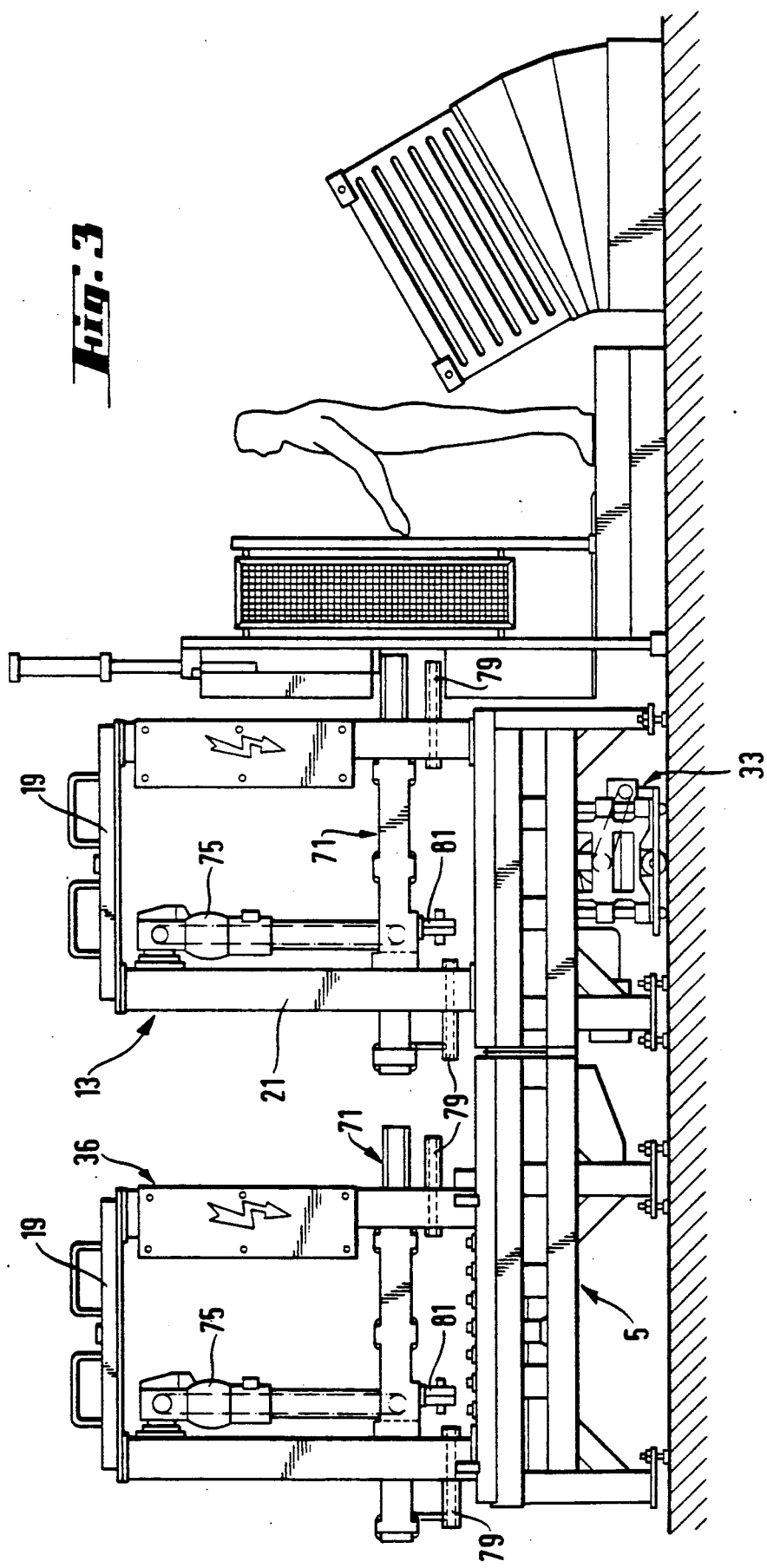
FIG. 3 shows a side view of the device shown in FIG. 1.

The actual operation of the tool-changing device will now be described. First, the workpiece is inserted into the workpiece holder 31. This can be done by a worker as shown in FIG. 3 or it can be performed automatically by means of a suitable apparatus. The workpiece is then moved up into its processing position. The lifter 33 located in the central section 7 of the lower frame 5 is provided for this purpose. The lifter 33, preferably, comprises an electric-motor drive in the form of a three-phase flat-spur-gear motor and a crank. The lifting movement is controlled by means of a precision switching mechanism. Once the operating height is reached, the tools 23 start the programmed processing of the workpiece. In the embodiment shown in the drawings, the tools 23 are mainly formed by electrode holders.

Once the processing of the workpiece has been carried out, the lifter 33 lowers the table 35 and with it the workpiece holder 31. During this movement, the processed part is deposited in the return conveyor device 71 and is then conveyed out of the tool frame 15 where it is received by an intermediate conveyor which deposits the part onto the conveying device of the next processing station. In the meantime, the workpiece holder 31 can receive another workpiece.

Just as each tool frame has a workpiece holder for accommodating a certain workpiece and its adapted tools, each workpiece frame is also equipped with separate conveying device 71. The drive of the conveying device 71 preferably consists of a change-pole worm-gear motor 75, conveying members with roller blocks 77, and also cam strips 79 which interact with a camshaft gear 81 for controlling the conveying step.

If other processing operations are to be carried out on the same workpiece in the same device or if the processing of a workpiece of a different shape should be desired, the device of the present invention does not need to be converted. To the contrary, another tool frame only needs to be moved into the working position over the central section 7 of the lower frame 5. For this purpose, it is first necessary for the tool frame 15 located in this position to be moved out, such as to the right in FIG. 2. Before this can be done, however, the clamping device 69 must be released, the centering device 65 must be retracted such that the workpiece holder is free from lifter 33, the swivelling clamping cylinders 63 must be released and the pinning units 55 must be retracted such that base plate 17 of the tool frame 15 is free from the lower frame 5. The connecting pins 53 of the driver 43 can now engage the bores 47 in the base plate 17 and the displacing unit 39 can move tool frame 15. Once the right hand position has been reached, tool frame 15 is secured by the pinning units 55, which again engage the bores 61 of the base plate 17. With displacing unit 37, it is possible to move the tool frame 15 at right angles to the step just described and into a waiting position further away.

The displacing unit 42 now moves up to the tool frame 13, couples onto it and pulls it into the processing position above the central section 7. The centering and clamping operations described above are then carried out in this position so that, subsequently, a new processing phase with changed tools can be carried out.

The tool frames can be easily moved by means of the displacing units 37, 39, 41 and 42 on the lower frame 7 in such a way that one of the three tool frames can always be brought into the working position. It is also possible to remove the tool frames from the lower frame by lifting them off using lugs 83. The tool frames can then be used in other similar devices either at the present site or at other sites. The tool frames can also be lifted off when the tools 23 have to be changed or replaced for a new workpiece. Since the tool frames always contain all tools for a particular phase of processing and also the conveying device for transporting the workpiece, it is now possible with the present invention, to carry out the positioning of tools for a new workpiece outside the actual production line (i.e. the center section) so that the actual production sequence is not disturbed.

In order to permit an easy exchange of the tool frames, all lines for supplying power and control signals to the device are preferably made via plug connections (not shown) on the tool frames which are constructed so as to be easily releasable. So that easy displacement of the tool frames on the lower frame is ensured without great expense, the power and control lines are fed to the individual tool frames from above, preferably through cable-trailing means.

The actual control signals for the device has not been discussed in detail because they can easily be realized by one skilled in the art from the information provided herein. If a specific program is specified, the device including the required changes of the tool frames can operate fully automatically. If used in combination with an operator, it is possible for the operator to not only insert the workpieces but also to give the commands for changing the tool frames.

While a presently preferred embodiment of practicing the invention has been shown and described with particularity in .connection with the accompanying drawings,.the invention may otherwise be embodied within the scope of the following claims.

What is claimed is:

1. A controlled tool-changing device for the automatic processing of differently shaped workpieces, comprising:

(a) a lower frame comprising a central section, a left hand section and a right hand section, a longitudinal guide on an upper side of the lower frame by means of which a plurality of tool frames can alternately be moved by a plurality of displacing units from an outer position into a position over the central section of the lower frame where it can be fixed by a first centering unit and a first clamping unit;

(b) each tool frame comprising a base plate having a recess into which a bottom plate of a workpiece holder is inserted, a head plate, a plurality of columns connecting the base plate to the head plate, and a plurality of tools fastened therein; and (c) the central section of the lower frame comprising a lifter having a table located thereon such that (i) the table is smaller in its dimensions than the recess in the base plate of the tool frame, (ii) when the tool frame is fixed above the central section the table can be connected to the bottom plate of the workpiece holder by a second centering unit and a second clamping unit, and (iii) the workpiece holder can be lifted such that it is possible to displace the tool frame on the longitudinal guide to beyond the table; and (d) a controlled drive for moving the table connected to the bottom plate of the workpiece holder from a lower insertion position into an upper processing position enabling the tools to act on the workpiece.

2. The device according to claim 1, wherein the plurality of tool frames comprise three tool frames such that for the alternate use thereof, the lower frame and the displacing units are extended beyond the left hand section and the right hand section to form additional surfaces for supporting a tool frame.

3. The device according to claim 2, wherein the sections of the lower frame form a U-shaped arrangement.

4. The device according to any one of claims 1 to 3, wherein each tool frame is provided with a conveying device for automatically picking up the workpiece, inserting it into the workpiece holder, and after processing is complete, moving it out of the device.

5. The device according to claim 4, wherein each conveying device has a separate drive unit.

6. The device according to any one of claims 1 to 3, wherein power and control signals for the tools in each tool frame are supplied by cables from one or more locations above the tool frame and wherein cable-trailing devices are used to enable the tool frames to be moved.

7. The device according to claim 4, wherein power and control signals for the tools in each tool frame are supplied by cables from one or more locations above the tool frame and wherein cable-trailing devices are used to enable the tool frames to be moved.

8. The device according to claim 6, wherein the cables are secured on each tool frame in such a way as to be easily releasable.

9. The device according to claim 7 wherein the cables are secured on each tool frame in such a way as to be easily releasable.

10. The device according to any one of claims 1 to 3, further comprising spring-mounted ball castors located on the lower frame for assisting displacement of the tool frames, the springs being designed in such a way that they apply, as a whole, a larger upward force than the weight of the tool frame.

* * * * *